United States Statutory Invention Registration [19]

[11] Reg. Number: H538

Betzold [43] Published: Nov. 1, 1988

[54] WEAPON FIRING INHIBITOR METHOD AND APPARATUS

[75] Inventor: Victor A. Betzold, Bel Air, Md.

[73] Assignee: The United States of America as represented by the Secretary of the Army, Washington, D.C.

[21] Appl. No.: 684,393

[22] Filed: Dec. 20, 1984

[51] Int. Cl.[4] ..... F41J 1/20

[52] U.S. Cl. ..... 89/134; 434/22

[58] Field of Search ..... 89/41.18, 134

[56] References Cited

U.S. PATENT DOCUMENTS

| | | | |
|---|---|---|---|
| 2,042,174 | 5/1936 | Foisy | 434/22 |
| 2,391,473 | 12/1945 | Mullen | 89/134 |
| 2,450,551 | 10/1948 | Harrington, Jr. | 89/134 |
| 2,472,136 | 6/1949 | Whitlock | 89/28.05 |
| 3,400,393 | 9/1968 | Ash | 89/41.18 |
| 3,703,845 | 11/1972 | Griew | 89/134 |
| 3,945,133 | 3/1976 | Mohon et al. | 434/22 |
| 4,349,337 | 9/1982 | Pardes | 434/20 |
| 4,470,817 | 9/1984 | Diehl et al. | 89/134 |

OTHER PUBLICATIONS

The New Encyclopaedia Britannica, vol. 11, p. 321, "stroboscope".

Webster's Third New International Dictionary, p. 2265 "stroboscope".

Fiber Optics and Lightwave Communications Standard Dictionary, p. 37 "code".

Millman et al, Pulse and Digital Circuits, 1956, pp. 313–315.

Technical Brief on Gun Elevation Limiting Device (GELD) DBA Systems, Inc., Melbourne, Florida 32901.

*Primary Examiner*—Stephen C. Bentley

*Attorney, Agent, or Firm*—Saul Elbaum; Thomas E. McDonald; Anthony T. Lane

[57] ABSTRACT

An apparatus and method which enables a weapon (usually on a test firing range) only when the weapon is aimed at a predetermined zone around a target. A transmitter subsystem comprising a strobe light, power supply and alignment scope is disposed at or near the target and oriented so as to transmit strobe light pulses of preselected pulse frequency, pulse duration and spectral content at a receiving subsystem. The receiving subsystem disposed at or near the weapon optically focuses the received strobe pulses on a detector, which provides electrical signals in accordance with the received pulses. These electrical signals are processed by detector electronics so that an enable signal is provided to the weapon only when a pair of pulses is detected within a preseslected time interval. In this way, the present invention prevents unwanted firing of the weapon when it is not properly aimed at the predetermined zone.

17 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

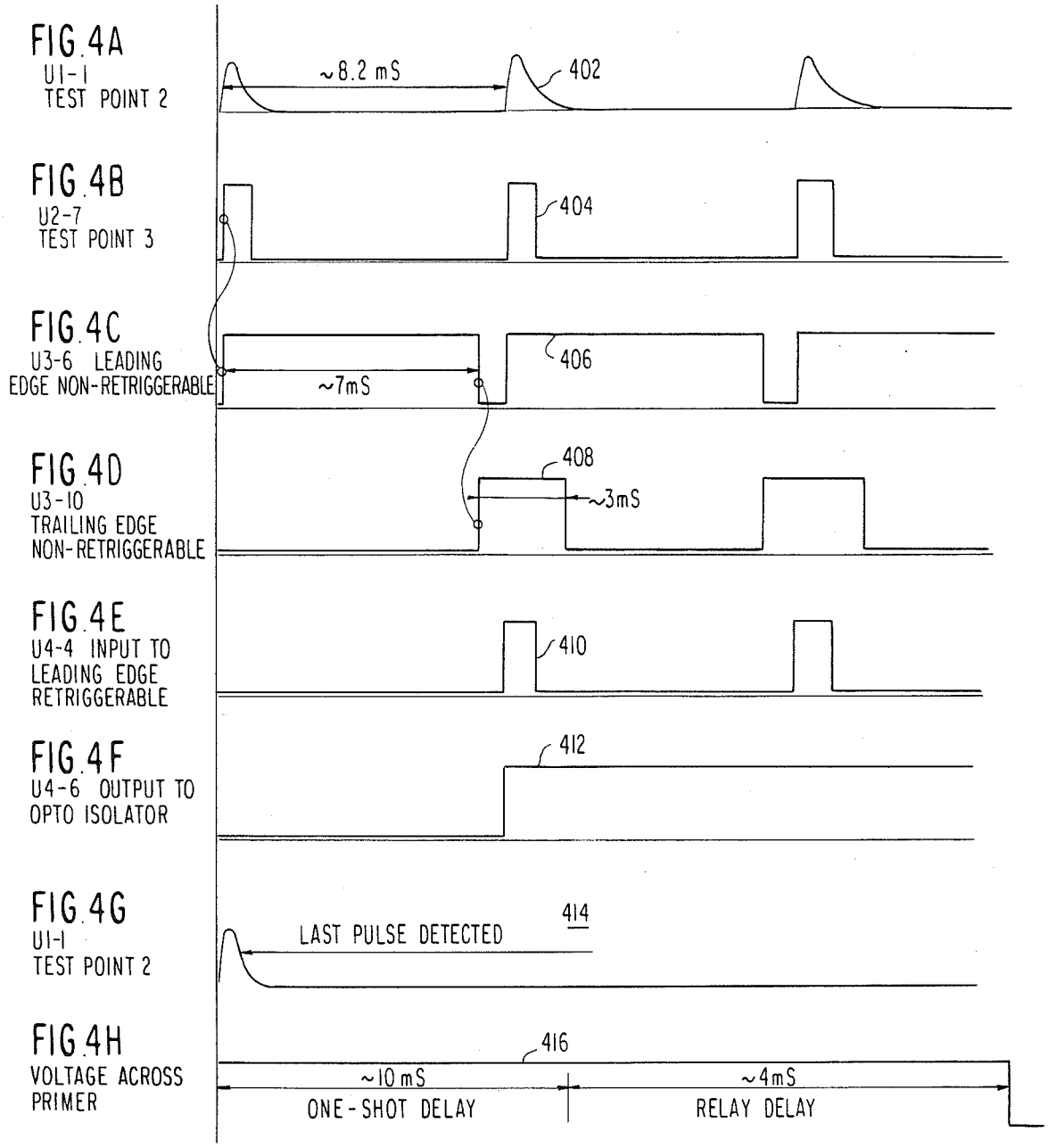
WEAPON FIRING INHIBITOR TIMING DIAGRAM

WEAPON FIRING INHIBITOR METHOD AND APPARATUS

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention relates generally to weapon firing control devices and methods, and, more particularly, to a weapon firing inhibitor for use with a tank-mounted weapon on a test firing or training range.

2. Related Art

Conventional weapon fire control or inhibitor systems often used electrical or electromechanical technology to provide the desired fire control or inhibition. Representative of these systems is U.S. Pat. No. 2,391,473 to Mullen which shows a system which inhibits a gun mounted on an aircraft from firing while a portion of the aircraft is in the line of fire of the gun. A photocell is separated from a light source by an opaque screen so that movement of the gun causes the screen to move relative to the light source and the photocell. The screen has openings which are arranged to cause the photocell to be illuminated by the light source whenever the position of the gun brings the aircraft into its line of fire. Specifically, the incident light upon the photocell energizes a solenoid coil which renders the gun inoperative.

A similar system is shown in U.S. Pat. No. 2,450,551 to Harrington, Jr. The Harrington, Jr. system is for a weapon mounted on a ship. A photocell is illuminated by a light source through an opening in an opaque screen whenever the weapon is aimed away from the ship. The absence of light upon this photocell renders the weapon inoperative. Thus, the weapon cannot inadvertently fire on the ship.

The Mullen and Harrington, Jr. systems are limited to protecting only the structures of the supporting vehicle. In contrast, on a firing range and in actual combat environments, it is desirable that the weapon be inhibited from firing unless it is aimed properly at a target: this is needed in order to protect objects on the range, populated areas beyond the normal projectile impact zone, "friendly" equipment on the battlefield, and the supporting vehicle itself.

One approach used to achieve these goals has been to inhibit the firing of a weapon whenever it receives an electromagnetic signal from the object at which it is aimed. For example, U.S. Pat. No. 3,400,393 to Ash shows a weapon safety mechanism which utilizes an electromagnetic wave receiving means to inhibit a small arms weapon from firing when aimed at a person (1) wearing a transponder radiating the proper electromagnetic wave or (2) wearing a garment or other device capable of reflecting the electromagnetic wave radiated by transmitting means associated with the weapon. Another approach is that shown in U.S. Pat. No. 2,472,136 to Whitlock. In Whitlock, a transponder located on each protected object or vehicle radiates a coded electromagnetic wave upon detecting a pulse-modulated electromagnetic wave radiated by the weapon having a fire control mechanism. In turn, the weapon receives the coded electromagnetic waves and is inhibited from firing at those objects from which it has received such signals.

Conventional systems using this approach give protection only to those objects from which the weapon receives an electromagnetic beam or signal. However, any other object on the battlefield or on the test range without the transmitting equipment providing the electromagnetic beam or signal that is properly detected is in danger of being fired upon. A more effective approach is to identify that which constitutes a proper target(s) or object(s) as opposed to identifying all "improper" targets or objects: this approach allows such improper targets or objects to be present even if they are unforeseen.

In accordance with this approach, conventional systems used on test firing ranges equip intended targets or objects with electromagnetic transmitters which enable the weapon tested only when it is aimed in a manner so that it receives an electromagnetic beam from an intended target. Representative of such conventional systems are those shown in U.S. Pat. No. 2,042,174 to Foisy, U.S. Pat. No. 3,945,133 to Mohon et al and U.S. Pat. No. 4,349,337 to Pardes. Each shows a simulation training device which indicates that a weapon has "hit" an intended target on a screen when an electromagnetic detector on the weapon is aligned with an electromagnetic beam reflected off the target screen. Note that each of these systems utilizes weapons which receive an electromagnetic beam in lieu of firing an actual bullet or projectile.

This approach also has been applied to situations in which live ammunition is fired at targets on a test range. Representative of such conventional systems is that of U.S. Pat. No. 3,703,845 to Griew, which teaches a small arms test firing range in which a hand-held weapon is enabled whenever a receiver on the weapon receives a continuous infrared beam from a transmitter located near an intended target. Reception at the weapon of the infrared beam from the target indicates that the weapon is properly pointed towards the target.

However, the Griew system exhibits several deficiencies or limitations, particularly with respect to large caliber vehicle-mounted weapons test firing over extended firing distances at intended targets. Specifically, the Griew system uses a continuous wave infrared source at the target which needs to be accurately detectable only over the range of a hand-held weapon (which is practically limited to less than a few hundred meters). In contrast, the range of a large caliber weapon (typically several hundred to several thousand meters) increases the distance by an order of magnitude over which such infrared source must be accurately detectable. In such a case, large amounts of power would be required to transmit a continuous wave infrared beam of a sufficient intensity so as to overcome the attenuation produced by the atmosphere and the interference caused by ambient radiation (such as sunlight and heat propagated by heated objects). The signal-to-noise ratio that can be obtained for a given power level over the extended distances present in test ranges for large caliber weapons is significantly reduced due to, among other things, radiation of substantially the same frequency emitted by the sun, and the dispersion of the transmitted beam due to dust, rain and other environmental conditions. The reduced signal-to-noise ratio deteriorates the detectability of the transmitted continuous wave signal. Note that a transmitter capable of generating a continuous wave signal of such power would be large (and thus of limited portability) and costly to manufacture and maintain. In addition, an infrared signal is not seen by the human eye, which would prevent a visual confirmation of the signal by a weapon operator.

Another deficiency or limitation of the Griew system is that the detector circuit of the weapon being test fired is susceptible to improper or "false" triggering by flashes of radiation such as that produced by the reflection of sunlight off a reflective surface. The occurrence of a flash of radiation could result in the improper firing of the test weapon. On an open, outdoor test range which typically covers thousands of square meters, the probability of such an improper firing occurring is often too high to obtain the desired safety of operation.

Furthermore, the Griew system would require extensive modifications to transform a conventional weapon (either hand-held or vehicle-mounted) into one suitable for use on the test range. The Griew system also requires input from four detectors to the control circuit in order to determine whether the weapon should be enabled for firing. The required modifications shown for the Griew system are designed particularly for use with small firearms, and may not be suitable for the more complex firing mechanisms of larger weapons. It should be appreciated that the inclusion of the Griew control circuit into the firing mechanism of complex weaponry would require costly modifications. Also once a weapon is modified, it cannot be operated off the test range; custom built weapons for use only on the test range would be the net result. Further, the Griew system requires that the test weapon be connected through the control circuit to a guard ring of electromagnetic beams that inhibit the test weapon should an object interrupt any of the beams. It is impractical for a weapon to be physically or electromagnetically connected to a fixed position on an open range, which would be required if the guard ring of electromagnetic beams is used. Gun emplacement thus would be restricted to terrains suitable for maintaining contact with the guard ring.

SUMMARY OF THE INVENTION

The present invention is an apparatus and method for enabling a weapon only when it is aimed at a predetermined zone around a target. The present invention has particular applicability for weapon testing on a test or training range, where the weapon is vehicle-mounted and is of a large caliber firing over a long distance.

In one embodiment, the present invention comprises a transmitting subsystem and a receiving subsystem. The transmitting subsystem is disposed at or near the target, and comprises a strobe light, a power supply, and an alignment scope. The strobe light, which is powered by the power supply, generates strobe light pulses of a preselected pulse frequency, pulse duration and spectral content. The transmitting subsystem is aligned using the alignment scope so that the strobe light pulses are transmitted toward the receiving subsystem when the weapon is aimed at the predetermined zone. Because strobe light pulses are employed, the power supply required to power the strobe light can be very small to produce a given instantaneous light intensity as compared to a conventional system utilizing a continuous transmitted light.

The receiving subsystem is disposed at or near the weapon and is aligned (using an alignment scope) with respect to the transmitting subsystem so as to receive the strobe light pulses when the weapon is aimed at the predetermined zone. The receiving subsystem, in a preferred embodiment, comprises an optical assembly, a detector, and associated detector electronics. Specifically, the optical assembly receives the strobe light pulses transmitted from the transmitter subsystem and focuses them on a film plane at which the detector is disposed in or adjacent to. The detector generates an electronic signal in accordance with each received strobe light pulse that is focused onto the plane. These electrical signals are processed by the detector electronics so that an enable signal is first provided only when two of the strobe light pulses are detected within a preselected time interval.

The preferred detection approach in accordance with the apparatus and method of the present invention is as follows. Each electrical signal corresponding to a received strobe light pulse is first high pass filtered so as to remove unwanted low frequency and D.C. components, and is then amplified by a preselected amount. The high pass filtered, amplified signal is provided to a comparator, which provides an output digital pulse whenever the input signal exceeds a preselected threshold level. This output digital pulse (if present) is provided to a pair of cascaded non-retriggerable one-shot multivibrators and associated digital logic gates so that a time window beginning after the lapse of a first preselected time interval is defined after the receipt of this first digital pulse. The output of the cascaded pair of multivibrators and associated digital logic gates is supplied to a retriggerable one-shot multivibrator, which generates an output signal when another output digital pulse is received during the time window; the duration of this output signal is selected so that it will be provided for a preselected time period greater than the time period between successive strobe light pulses. This output signal is used to generate an enable signal. In this way, the enable signal (during normal operation when the weapon is aimed at the predetermined zone) is provided while the detector electronics is processing the next received strobe light pulse. This results in the apparatus and method of the present invention enabling the weapon as long as it is aimed at the predetermined zone.

The receiving subsystem preferably is disposed inside an appropriate electromagnetic interference resistant enclosure (typically steel) so that it does not provide an enable signal improperly due to electromagnetic or radio frequency interference. Further, the receiving subsystem utilizes integrated circuit technology and associated discrete components which require low power to operate. In this way, the receiving subsystem can be utilized with a vehicle or other portable type of weapon so that such weapon can be tested in normal battlefield conditions on the test firing range.

The use of the strobe light pulses and the time window for detection results in the present invention not incorrectly enabling the weapon due to environmental conditions or single light flashes reflected off of objects on the test firing range.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 4 is a timing diagram showing the operation of the embodiment of FIG. 3, wherein the vertical axis of each plot represents amplitude and the horizontal axis of each plot represents time.

DETAILED DESCRIPTION OF THE PREFERRED EMBODIMENT

Briefly, the present invention is a method and apparatus for controlling the firing mechanism of a weapon system (such as a tank) in order to prevent the weapon system from being capable of firing unless it is pointed within a predetermined zone around a desired target. This ensures that the weapon system will not damage or harm objects outside of the predetermined zone. When used on a firing range, the present invention allows weapon systems to be tested without running the risk of damaging objects outside of the predetermined zone around the target at which the weapon is being fired.

As discussed in greater detail below, the present invention has particular applicability to large weapons systems which fire projectiles at targets displaced in the range of 500–4,000 meters from the weapon. A typical example of a suitable weapon system with which the present invention can be employed is a weapon mounted on a tank or other moving vehicle. It should be noted, however, that while a tank-mounted weapon is used in the following description of the present invention, the present invention is not limited to such a weapon and can be employed with any type of weapon system (for example, a weapon system carried by a soldier such as a wire-guided missile or a bazooka) and any type of target (whether moving or stationary).

The present invention allows the control of the firing of a weapon system to take place in normal battlefield conditions. Environmental factors such as ambient light level, dust and other particulate matter, optical reflections off of reflective surfaces (which are not repetitive or continuous), precipitation (in the form of rain, sleet or snow), temperature, etc., can be compensated for by the present invention over normal ranges of operation without an improper firing taking place. This allows the present invention to be used in the various situations in which such weapons normally operate; these are mimicked during test firings on firing ranges and the like.

Figure 1:
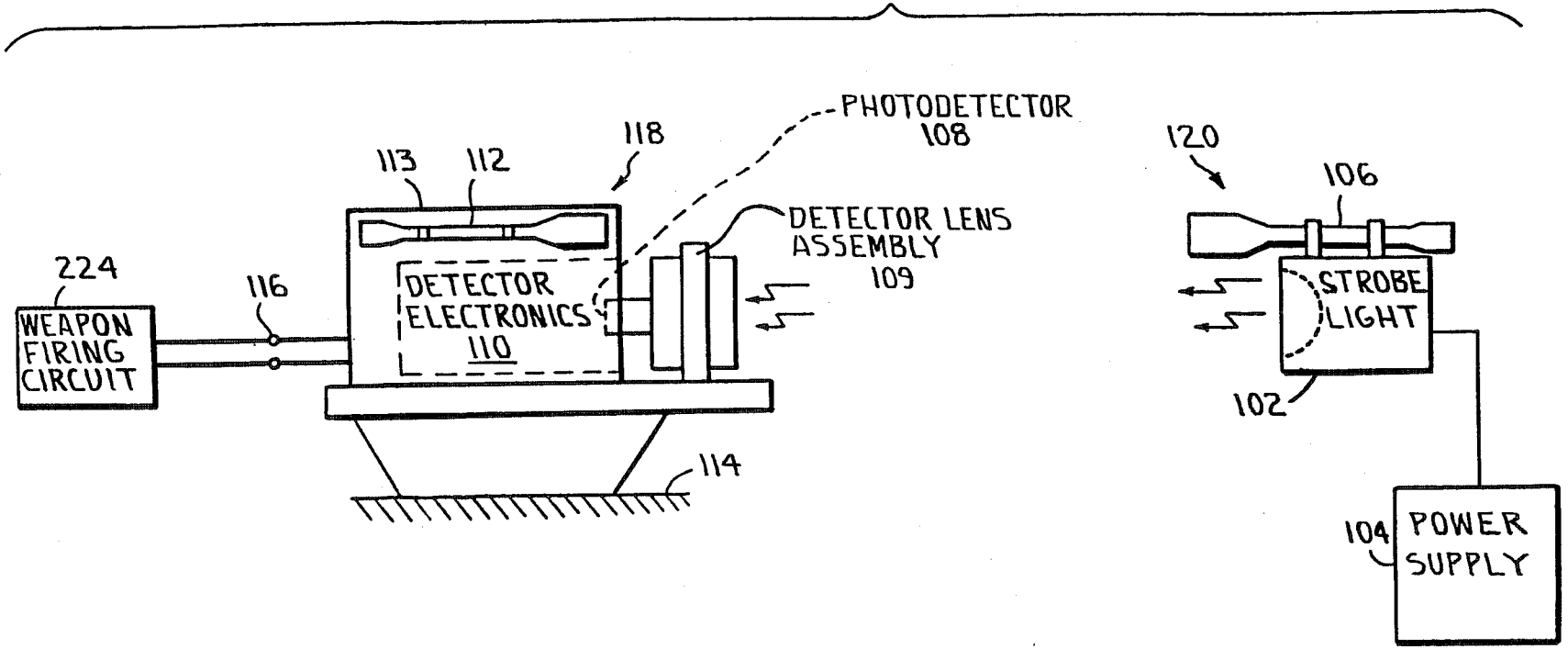
FIG. 1 is a side view of a preferred embodiment of the receiving subsystem 118 and the transmitting subsystem 120 of the present invention.

Referring now to FIG. 1, a side view of a representative embodiment is shown of the receiving subsystem 118 and the transmitting subsystem 120 of the present invention. In summary, the transmitting subsystem 120 is located at or near the target (not shown) at which the weapon (not shown) is to be fired. The transmitting subsystem 120 generally comprises a strobe light 102, a strobe alignment scope 106, and a power supply 104.

Strobe light 102 generates a strobe light output (indicated generally by a pair of arrows) of a preselected pulse frequency, pulse duration, and spectral content. A representative example of a suitable strobe light 102 is a Chadwick Helmuth Model 270 of Chadwick Helmuth, Monrovia, Calif. Any particular pulse frequency, pulse duration or spectral content can be used which will allow the present invention to operate properly in the firing environment in which it is utilized. For example, a representative range for the pulse frequency is 50–500 pulses per second, with a preferred pulse frequency of, for example, 166 flashes or pulses per second. A representative range for the pulse duration is 0.1–50 microseconds, with a preferred duration of 8 microseconds. A representative spectral content is that of a strobe light operating partially in the visible range (300–2,000 nanometers), with a preferred spectral content being in the range of 500–1,500 nanometers. Note that the present invention is not limited to these ranges, and that other pulse frequencies, pulse durations and spectral contents can be used and are within the scope of the present invention.

The strobe light 102 is supplied with electric power by the power source or supply 104 for producing the strobe light output. Any suitable type of power source 104 can be employed. A suitable example for power source 104 is a Chadwick Helmuth Model 236. Typically, power source 104 requires 120VAC at low current as may be provided by a portable AC generator or battery operated inverter. This allows the transmitting subsystem 120 to be located at or near a target which is not disposed near electric power lines. It should be understood that the present invention is particularly suitable for use in field applications not near electric power lines because of the very low power required due to the very low duty cycle of the strobe light 102. A battery operated inverter or AC generator is necessary.

Alignment scope 106 of the transmitting subsystem 120 is used in conjunction with a detector alignment scope 112 of the receiving subsystem 118 so that the strobe output of the strobe light 102 can be focused in a desired manner at the receiving subsystem 118. Any suitable type of optical assembly that allows the output of the strobe light 102 to be focused in a proper manner at the receiving subsystem 118 can be employed. A representative example of a suitable optical assembly for alignment scope 106 is a Model K10-1 scope made by W. R. Weaver Co., El Paso, Tex. The focusing of the output of the strobe light 102 at the receiving subsystem 118 is discussed in detail below.

Turning now to the receiving subsystem 118, it is disposed at or near the weapon (not shown) so that it receives the strobe light propagated from the transmitting subsystem 120 when the weapon (such as the barrel of the gun) is aimed at the target so as to be within the preselected zone surrounding the target. Typically, the receiving subsystem 118 is suitably mounted to the mantlet 114 of a tank main weapon (not shown).

The receiving subsystem 118 basically comprises a detector lens assembly 109, a photodetector 108, detector electronics 110 (which is housed in an enclosure 113), and the detector alignment scope 112. Briefly, detector lens assembly 109 receives the strobe light propagated from strobe light 102 when the weapon is pointed within the predetermined zone around the target. Any suitable optical system can be used for detector lens assembly 109 which produces the desired focusing. A representative example for detector lens assembly 109 is a Vivitar 600 mm f8.0 solid catadioptric lens made by the Applied Optics Division of Perkin-Elmer, Garden Grove, Calif. Note that the predetermined zone around the target is defined by the placement of the transmitting subsystem 120 relative to the receiving subsystem 118 together with the electronics and optics that are used.

The received strobe light is focused by the detector lens assembly 109 onto the photodetector 108, which generates an electronic output signal supplied to the detector electronics 110. Detector electronics 110 supplies relay coil voltage 416 (as shown in FIG. 4H) to relay 344 to enable firing circuit 224 on relay lines 116 after two consecutive strobe light pulses are received having an amplitude, pulse frequency, pulse duration and spectral content within specified ranges; detector electronics 110 continues to supply this relay coil voltage 416 as long as such consecutive strobe pulses are detected. As soon as such consecutive strobe pulses are not detected (and subsequent to time delays in the receiving subsystem 118), detector electronics 110 ceases to enable the firing circuit 224 on relay lines 116. The weapon is enabled only when the weapon firing pulse can propagate through the relay lines 116. It thus can be appreciated that the receiving subsystem 118 enables the weapon only when it is pointed within the predetermined zone around the target.

Environmental factors such as those discussed above cannot result in improper operation of the receiving subsystem 118 of the present invention for the following reasons. As noted above, the relay coil voltage 416 enables relay lines 116 only when successive strobe pulses (propagated from the transmitting subsystem 120) are received and are above the preselected amplitude level and within the preselected pulse frequency, pulse duration and spectral content ranges. False triggering of the receiving subsystem 118 by a non-continuous, single pulse or flash of light (such as that produced by the reflection of sunlight off a shiny surface) cannot result in the weapon being enabled.

The present invention also allows the transmitting subsystem 120 to operate using a low total light power output because strobed light is used. In conventional systems employing a continuous light signal, the power output of the light must be very high in order for the receiving station to be able to detect it over the normal distances which separate the transmitter from the receiver. The use of strobed light in the present invention requires only a low total light power output because the duty cycle of the strobe light is very low. In other words, the amplitude of the strobe pulse is very high, but the average power output for the signal over time is low because of the low duty cycle that is used. Further, since the receiving subsystem 118 detects strobe signals in accordance with their pulse frequency, the detection "window" of the receiving subsystem 118 is able to differentiate this light from unwanted ambient and environmental factors. This produces a higher signal-to-noise ratio for a given total light power output as compared to that of a conventional system using continuous light.

Electromagnetic interference (EMI) and radio frequency interference (RFI) also are prevented from causing improper operation of the receiving subsystem 118 because the detector electronics 110 is housed in enclosure 113. Enclosure 113 can be fabricated from any material and be configured having any shape that produces the desired EMI and RFI shielding. A suitable material for enclosure 113 is steel.

Figure 2:
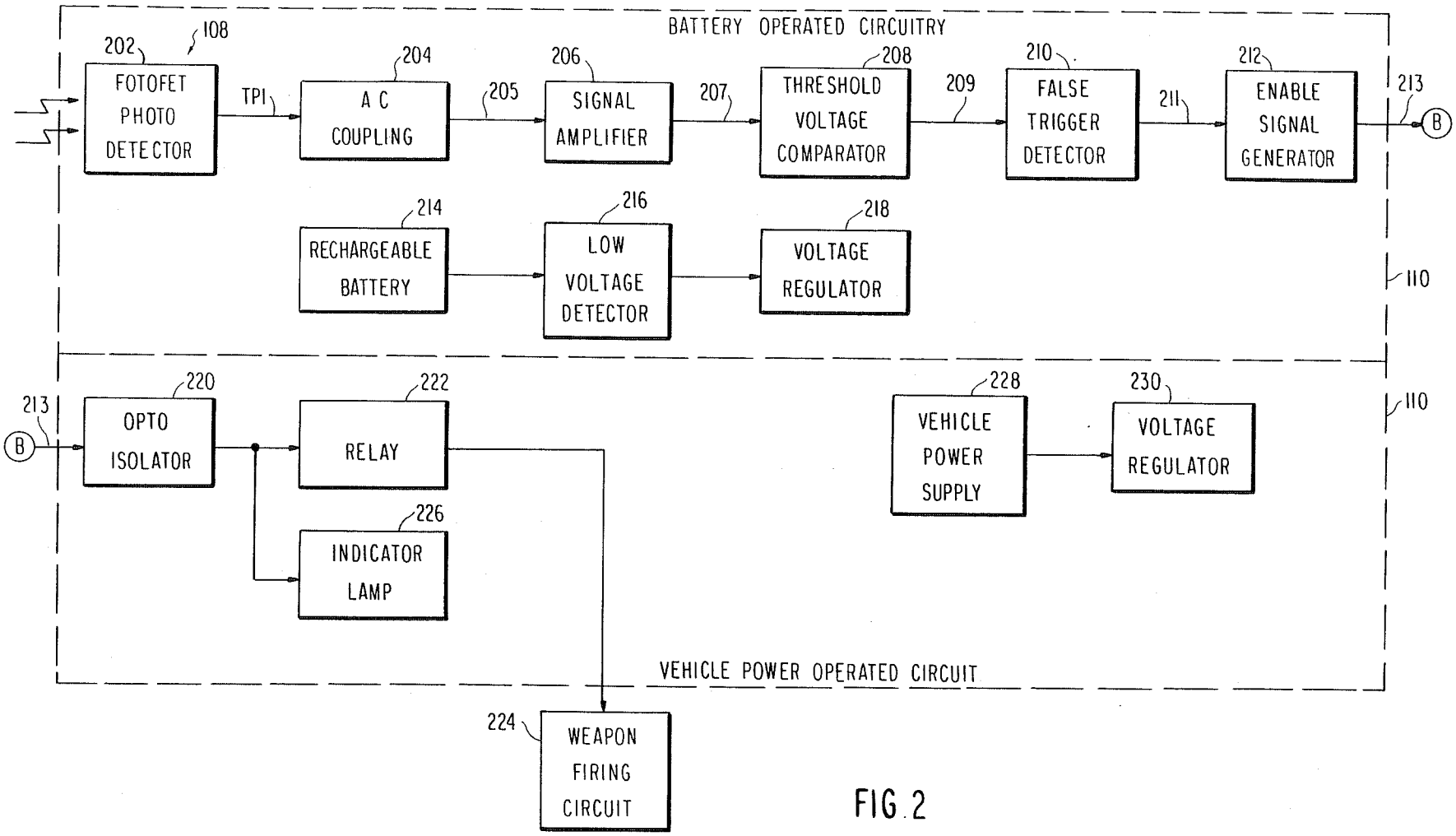
FIG. 2 is a block diagram of an embodiment of the photodetector 108 and detector electronics 110 of the receiving subsystem 118.
Figure 3:
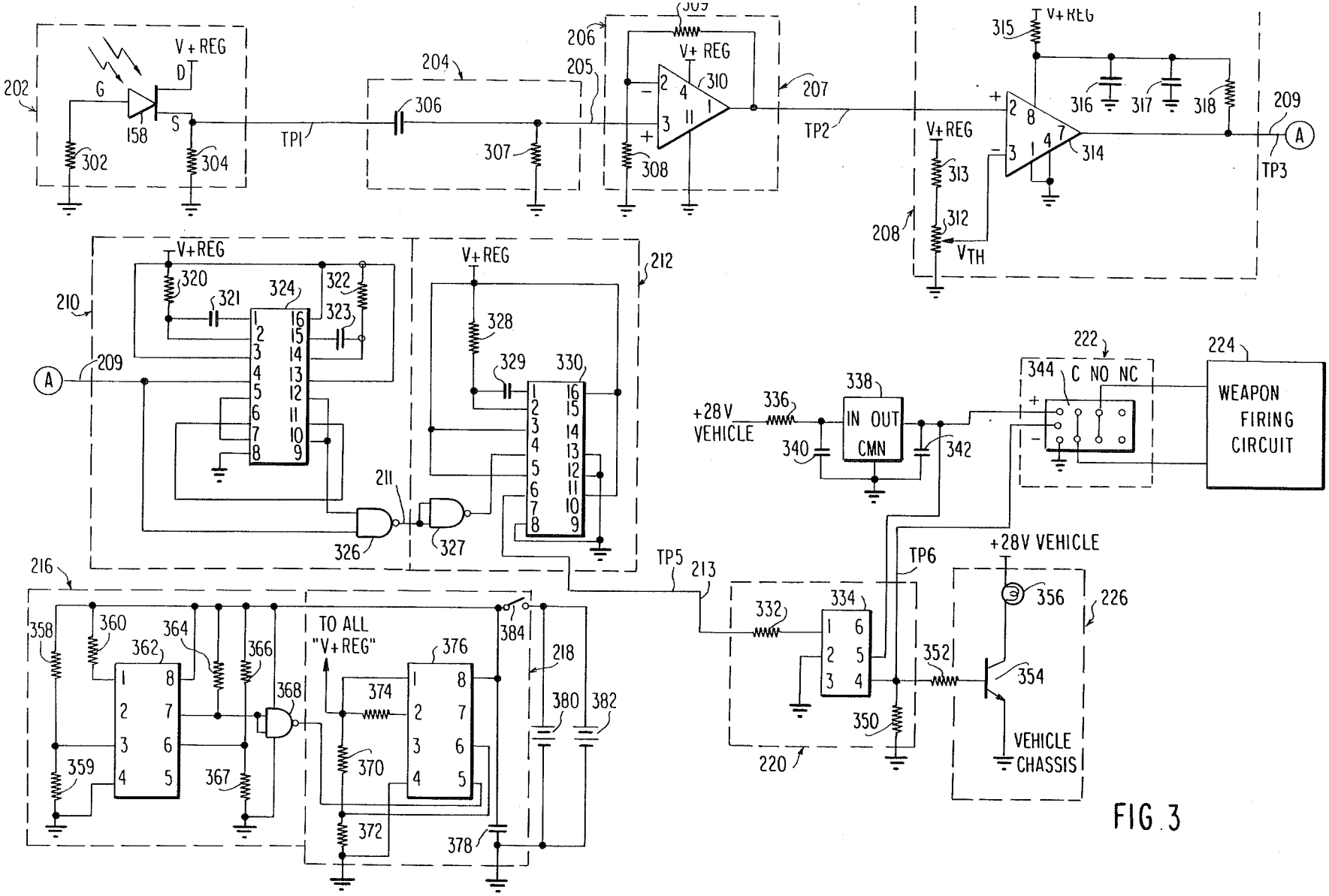
FIG. 3 is a schematic diagram of a preferred embodiment of the photodetector 108 and detector electronics 110 of FIG. 2.

FIGS. 2, 3 and 4 show the structure and operation of a preferred embodiment of an electronic circuit which acts as the photodetector 108 and detector electronics 110 of the receiving subsystem 118. While the circuit shown in these Figures is described in detail below to illustrate the structure and operation of the present invention, it should be understood that other circuits and approaches can be employed to achieve the operation and function of the present invention and still be within the scope of the present invention.

FIG. 2 shows a block diagram of a representative embodiment of the photodetector 108 and the detector electronics 110 of the receiving subsystem 118. FIG. 3 shows the schematic of a representative circuit which implements the block diagram shown in FIG. 2. FIG. 4 plots the waveforms of the embodiment shown in FIG. 3 at various points in the circuit during its normal operation in detecting the strobe signal resulting in an enablement of the weapon. Note that the representative embodiment of FIG. 2 is divided into a battery-operated circuit and a vehicle power operated circuit only for purpose of illustration.

Referring now to FIGS. 2–4, a photodetector stage 202 of the photodetector 108 receives from the detector lens assembly 109 (only shown in FIG. 1) light focused by the detector lens assembly 109 on a film plane (not shown). This focused light includes the propagated strobe light received from the transmitting subsystem 120 when the detector lens assembly 109 is pointed at the transmitting subsystem 120. The focused light is received by the photodetector stage 202, which provides an output signal as a function of the amplitude level, pulse frequency, pulse duration, and spectral content of the received light. It can be appreciated that the photodetector stage 202 can be selected to produce a desired response for given amplitude, pulse frequency, pulse duration and spectral content characteristics. FIG. 3 shows a representative circuit for implementing photodetector stage 202, which comprises a FET phototransistor 158 connected in a source follower configuration. The values of bias resistors 302 and 304 are selected so that phototransistor 158 is ON continuously and exhibits the desired voltage gain. Test point 1 (TP1) is the output of the ( photodetector stage 202. Note that this output has an amplitude level as a function of the intensity of the light focused by the detector lens assembly 109.

The TP1 output of photodetector stage 202 is supplied to the input of an A.C. coupling stage 204. A.C. coupling stage 204 acts as a high pass filter of the TP1 signal. Such a high pass filter is used to remove the D.C. component from this signal, which corresponds to the ambient received light level and the biasing used for phototransistor 158. FIG. 3 shows a representative circuit for the A.C. coupling stage 204. This circuit comprises a capacitor 306 and a resistor 307, which are connected in a high pass filter configuration. The values for capacitor 306 and resistor 307 are selected so that the desired high pass filter response is obtained.

The output on line 205 from A.C. coupling stage 204 is supplied to the input of a signal amplifier stage 206. Signal amplifier stage 206 acts to amplify the filtered signal on line 205 by a preselected amount. FIG. 3 shows a representative circuit for implementing signal amplifier stage 206. This circuit comprises an operational amplifier 310 of conventional design connected in a feedback mode configuration. The filtered signal on line 205 is supplied to the non-inverting input of the operational amplifier 310. It can be appreciated that any suitable operational amplifier producing the desired gain and slew rate can be employed for operational amplifier 310.

The output from signal amplifier stage 206 on line 207 (also designated as TP2) is supplied to the input of a threshold voltage comparator stage 208. FIG. 4A plots the signal on line 207 produced when a strobe light signal is received by the phototransistor 158 having an amplitude above and a pulse frequency, pulse duration and spectral content within a specified range; this occurs when the weapon is pointed within the predetermined zone around the target. FIG. 4A plots amplitude on the vertical axis and time on the horizontal axis. In the example shown in FIG. 4A, the pulse frequency is 122 pulses per second, which results in pulse signals being spaced at approximately 8.2 millisecond intervals. Obviously, these signals will beat different intervals if a different pulse frequency is used.

Threshold voltage comparator stage 208 produces an output signal on a line 209 when the amplitude of the input signal on line 207 is above a preselected threshold level. A representative circuit for implementing the threshold voltage comparator stage 208 is shown in FIG. 3, and comprises a voltage comparator 314 of conventional design connected in a voltage comparator configuration. Specifically, the non-inverting input of voltage comparator 314 receives the input signal (line 207), while the inverting input receives an input signal of a preselected voltage level. The output of operational amplifier 314 (present at pin 7 in the representative circuit) is supplied to line 209. Transients are eliminated through the use of a filter comprising resistor 315 and capacitors 316 and 317. The values for these components are selected so as to eliminate the transient signals induced on the power supply line by switching of the voltage comparator 314.

Referring now to FIG. 4B, which plots amplitude on the vertical axis and time on the horizontal axis, the signals supplied by voltage comparator 314 on line 209 are plotted. It is seen that voltage comparator 314 produces on line 209 a squared or digital version of the input signals on line 207 which are above a preselected threshold level. These digital signals are needed in order to achieve the signal processing performed by subsequent stages.

A false trigger detector stage 210 receives the digital signals on line 209. The false trigger detector stage 210 produces an output pulse on line 211 only when two consecutive pulses on line 209 are detected within a predetermined time interval (also called a "time window"). A representative circuit of the false trigger detector stage 210 is shown in FIG. 3. It includes an integrated circuit 324 of conventional design configured as a pair of non-retriggerable one-shot multivibrators. The first non-retriggerable one-shot multivibrator comprises pins 1 through 7 of IC 324, and pins 9 through 15 comprise the second non-retriggerable one-shot multivibrator. In operation, the input pulse on line 209 is supplied to pin 4. This causes the output on line 6 to go HIGH for a preselected time duration or period (for example, 7 milliseconds, as plotted in FIG. 4C) which is determined by a resistor 320 and a capacitor 321 of a timing circuit connected to pins 1 and 2. Note that this preselected time period is less than the period defined by the pulse frequency. The output signal from pin 6 is supplied to pin 11, the input of the second non-retriggerable one-shot multivibrator. When the signal from pin 6 goes LOW, this causes the output (pins 10 and 12) to go HIGH for a preselected time period or duration determined by a time constant produced by a resistor 322 and a capacitor 323. This operation is illustrated in FIG. 4D, where the waveform 408 goes HIGH when waveform 406 goes LOW (FIG. 4C) after a 7 millisecond time period has lapsed. The time period shown for waveform 408 in the HIGH state (the so-called "time window") is approximately 3 milliseconds. A pulse in the HIGH state must be provided on line 209 within this time window in order for false trigger stage 210 to produce a pulse waveform 410 on the output of a NAND gate 327, as plotted in FIG. 4E. This shows that false trigger detector stage 210 produces an output pulse only when the second of two consecutive input pulses is received during the time window.

An output pulse from false trigger detector stage 210 is produced as follows. An output from pins 10 and 12 is supplied to a first input of a NAND gate 326, whose second input is connected directly to line 209. NAND gate 326 produces an output signal (line 211) in the LOW state only when both of the input signals are in the HIGH state. This occurs when a digital pulse on line 209 is received within the time window defined by waveform 408.

The signal on line 211 is supplied to the input of an enable signal generator stage 212. Enable signal generator stage 212 provides a constant output signal in the HIGH state only as long as it continues to receive pulses at its input, at a period less than the pulse duration selected with resistor 328 and capacitor 329. A representative example of the circuit for implementing the enable signal generator stage 212 is shown in FIG. 3. It includes an integrated circuit 330 of conventional design having a pair of retriggerable one-shot multivibrators. The output of NAND gate 326 is supplied to both inputs of NAND gate 327. This results in the inversion of the output signal from NAND gate 326. The output of NAND gate 327 (plotted in FIG. 4E) is supplied to the input (pin 4) of the first retriggerable one-shot multivibrator of IC 330. The signal on the output (pin 6) of this one-shot is in the HIGH state as long as an input digital pulse is received at pin 4 within the preselected time period after the receipt of the previous digital pulse. This preselected time period is determined by the values of a resistor 328 and a capacitor 329, and is at least as long as the interval defined by the preselected pulse frequency. As illustrated in FIG. 4F, waveform 412 shows that the signal at the output (pin 6) of the one-shot goes to the HIGH state upon the receipt of the first digital pulse of waveform 410, and stays in the HIGH state as long as it continues to receive an additional digital pulse within each successive preselected time period.

The output (line 213) from the enable signal generator stage 212 is supplied to the input of an opto-isolator stage 220. Opto-isolator stage 220 is used to isolate battery common from vehicle ground. The opto-isolator stage 220 allows the detector electronics 110 of the receiving subsystem 118 to operate a relay stage 222 (of any suitable type) for controlling the enablement of the firing of the weapon. Such control of the enablement of the weapon in many situations will require a high power control signal since electromechanical systems or approaches are used. The opto-isolator circuit serves to minimize the possibility of conducted interference from vehicle electrical functions.

Relay stage 222, as shown in FIG. 2, enables a firing circuit stage 224 and operates in conjunction with an optional lamp indicator stage 226. These stages are used to control the firing of a weapon so as to allow it to be enabled only when the signal received at the input of opto-isolator stage 220 is in the HIGH state. Note that FIGS. 4G and 4H do not share the same time axis as do FIGS. 4A to 4F. The time axes of FIGS. 4G and H show the situation where the last pulse has been detected by the detector electronics 110 and the weapon is thus being disabled by the detector electronics 110. Note that opto-isolator stage 220 provides an indicator lamp signal to indicator lamp stage 226 when the weapon is enabled.

FIG. 4G plots the detection of the last pulse of a consecutive series of pulses which have acted to enable the weapon for firing. After the receipt of this last pulse, it is seen that the voltage applied across the coil of the relay stage 222 stays in the HIGH state for a preselected period of time (for example, 10 milliseconds) dependent on when the strobe light signal is lost relative to the last pulse from integrated circuit 330. Due to inherent relay release delay, typically 4 milliseconds, the relay stage 222 remains enabled for a time period which occurs subsequent to the detection of the last enable signal. Note, however, that this time duration is effectively so short that it is physically impossible for the weapon to move sufficiently so as to be aimed a significant amount from the predetermined zone around the target. In other words, the unwanted time delay exhibited by the relay stage 222 is sufficiently short so that undesired enablement of the weapon does not result in damage because of improper firing of the weapon.

Referring again to FIG. 2, the stages used to power the receiving subsystem 118 of the present invention are shown. They comprise rechargeable battery 214, a low voltage detector stage 216, and a voltage regulator stage 218. They also comprise a vehicle power supply 228 and a voltage regulator stage 230. All are of conventional design. False detection due to under voltage conditions of the rechargeable battery 214 do not occur in the present invention because low voltage detector stage 216 and voltage regulator stage 218 are used. Together, these provide an indication of a low voltage condition of the battery 214 used to power some of the detector electronics 110, and cause the detector electronics 110 to be rendered inoperable when this low voltage condition is detected.

Note that opto-isolator stage 220 is used to isolate electrically the detector electronics 110 from the vehicle power supply 228. This is required in order to achieve the desired operation of the detector electronics 110. This prevents radio frequency interference (RFI) and other unwanted signal components present on the vehicle power supply from being introduced into the detector electronics 110. Such unwanted signals would result in improper operation of the detector electronics 110, so that it would not produce the desired control functions.

Obviously, numerous modifications and variations of the present invention are possible in light of the above teachings. It is therefore to be understood that within the scope of the appended claims, the invention may be practiced otherwise than is specifically described here.

What is claimed is:

1. A method for ensuring that a weapon is enabled to fire only when aimed at a predetermined zone around a target, which method comprises the steps of:

(a) transmitting from or near the target towards the weapon strobe light pulses of preselected pulse frequency, pulse duration and spectral content:

(b) at or near the weapon, optically focusing said stobe light pulses when the weapon is aimed at the predetermined zone;

(c) converting each of said optically focused strobe light pulses into a corresponding first electrical signal having an amplitude value as a function of intensity;

(d) generating an enable signal for a first preselected time period at least as long as a time period defined by said preselected pulse frequency only when one of said first electrical signals is detected within a second preselected time period after another one of said first electrical sigals is detected: and (e) enabling the weapon only when said enable signal is provided.

2. The method as recited in claim 1, wherein step (d) generates said enable signal only when said one of said first electrical signals is detected within said second preselected time period after the lapse of a third preselected time period begun with the detection of said another one of said first electrical signals.

3. The method as recited in claim 1, further comprising between steps (c) and (d) the step of:

(f) generating a third electrical signal of a second preselected time period after detection of said another one of said first electrical signals having an amplitude value above a preselected amplitude level, wherein said third preselected time period has a duration less than a time period defined by said preselected pulse frequency.

4. The method as recited in claim 3, further comprising between steps (f) and (d) the step of:

(g) generating a third electrical signal of said second preselected time period when said second electrical signal is no longer present.

5. The method as recited in claim 4, further comprising the step of generating an indicator lamp signal in accordance with said enable signal.

6. The method as recited in claim 1, further comprising between steps (c) and (d) the step of:

(f) high pass filtering said first electrical signal in order to remove undesired low frequency components.

7. Apparatus for ensuring that a weapon is enabled to fire only when aimed at a predetermined zone around a target, which apparatus comprises:

a transmitting means disposed at or near the predetermined zone including (i) power supply means for supplying electric power, and (ii) strobe light means connected to said power supply means for generating and transmitting strobe light pulses of preselected pulse frequency, pulse duration and spectral content towards the weapon; and (b) receiving means disposed at or near the weapon for receiving said strobe light pulses from said transmitting means and for enabling the weapon when a pair of successive ones of received strobe light pulses is detected.

8. The apparatus as recited in claim 7, wherein said receiving means comprises an optics means for focusing onto a plane said strobe light pulses from said transmitting means.

9. The apparatus as recited in claim 8, wherein said receiving means further comprises detector means disposed at or near said plane for producing a first signal for each of said strobe light pulses.

10. The apparatus as recited in claim 9, wherein said receiving means further comprises first means for generating an enable signal when a pair of said first signals is detected within a first preselected time period.

11. The apparatus as recited in claim 10, wherein said first means further comprises means for defining said first preselected time period as being substantially equal to the period of said preselected pulse frequency.

12. The apparatus as recited in claim 10, wherein said receiving means further comprises second means under control of said first means for generating said enable signal for a second preselected time period when said pair of said first signal is detected.

13. The apparatus as recited in claim 9, wherein said receiving means further comprises filter means connected to said detector means for high pass filtering said first signal to produce a second signal.

14. The apparatus as recited in claim 13, wherein said receiving means further comprises amplifying means connected to said filter means for amplifying said second signal to produce a third signal.

15. The apparatus as recited in claim 14, wherein said receiving means further comprises threshold means connected to said amplifying means for supplying a fourth signal when said third signal is above a threshold level.

16. The apparatus as recited in claim 15, wherein said receiving means further comprises means for supplying a fifth signal upon detection of one of said fourth signals within a first preselected time period commencing after the lapse of a second preselected time period beginning upon the detection of a previous one of said fourth signals.

17. Apparatus for ensuring that a weapon is enabled to fire only when aimed at a predetermined zone around a target, which apparatus comprises:

(a) transmitting means disposed at or near the predetermined zone comprising:

(i) power supply means for supplying electric power, and (ii) strobe light means connected to said power supply means for generating strobe light pulses of preselected pulse frequency, pulse duration and spectral content and for transmitting said strobe light pulses towards the weapon; and (b) receiving means disposed at or near the weapon for receiving said strobe light pulses from said transmitting means comprising:

(i) optics meals for focusing said strobe light pulses received from said transmitting means, (ii) detector means disposed to receive said focused strobe light pulses for producing a first signal for each of said focused strobe light pulses, (iii) high pass filter means connected to said detector means for high pass filtering each of said first signals to produce a corresponding second signal, (iv) amplifying means connected to said high pass filter means for producing a third signal as a function of each of said second signals, (v) threshold means connected to said amplifying means for providing a fourth signal in response to each of said third signals having an amplitude above a threshold level, (vi) false trigger means connected to said threshold means for producing a fifth signal upon receiving two of said fourth signals within a preselected time period, and (vii) enable means connected to said false trigger means for enabling the weapon upon receipt of said fifth signal.

* * * * *